JOSEPH SMITH.
Improved Potato Digger.
No. 120,832.  Patented Nov. 14, 1871.
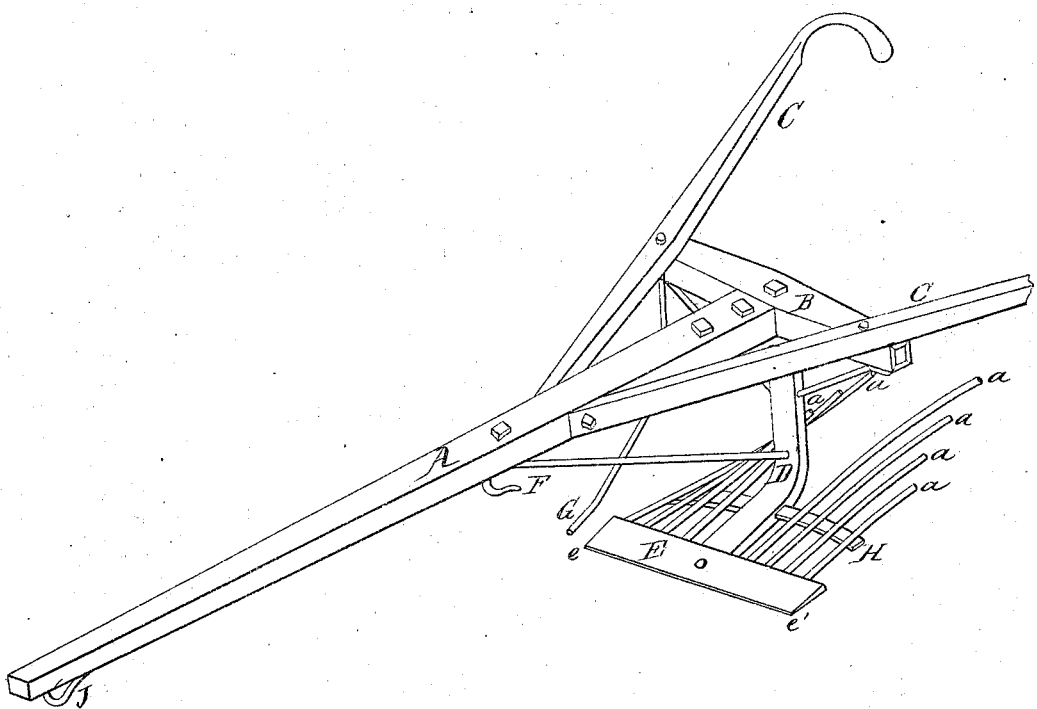
Witnesses.
C. W. Johnston.
L. F. Ward.
Inventor.
Joseph Smith.

UNITED STATES PATENT OFFICE.

JOSEPH SMITH, OF RIDGEVILLE, OHIO.

IMPROVEMENT IN POTATO-DIGGERS.

Specification forming part of Letters Patent No. 120,832, dated November 14, 1871.

*To all whom it may concern:*

Be it known that I, JOSEPH SMITH, of Ridgeville, in the county of Lorain and State of Ohio, have invented a new and Improved Potato-Digger, of which the following is a specification:

The first part of my invention consists essentially of a wood and iron frame so arranged that a span of horses or other team may be attached to it and driven one on each side of the row of potatoes, and the machine shall penetrate the earth below the potatoes and lift them out. The second part of my invention relates to the arrangement of the parts so as to throw the earth displaced on each side of the machine and in an inverted position, and also leave the potatoes on the top of the loosened earth, partly by sifting the earth through the iron fingers of the machine and partly by inverting the earth on each side of the row.

The drawing shows the whole machine in perspective.

The machine consists essentially of a tongue or pole, A, with its cross-piece B, to which the handles C and C are attached. D is an iron bar or shaft, of sufficient size to give the required strength to carry steadily the cutting-edge. If made of one inch and a half square iron it will be abundantly strong. The top of this bar is bent forward and forged, so as to be firmly bolted to the pole A and cross-piece B. Its lower end is also bent downward and forward, and to its lower end is welded or firmly attached in some other way the cutting-edge E. The cutting-edge is straight, placed at exact right angles with the line of motion, and is inclined downward at an angle of about twenty degrees, so that a slight pressure on the handles shall cause the edge to penetrate to any required depth. This cutting-edge is about one foot long, and may be four or five inches wide. The standard or bar D has attached to it, at a point near that at which it is bent forward, an arched brace, H, a part of a circle of about twenty inches in diameter, the purpose of which is to hold the iron sifting and inverting rods $a, a, a, a, a, a, a,$ and $a$. These rods are firmly attached to the cutting-bar, and also to the arc H, and are so bent as to conform to the general form of a well-shaped mold-board of a plow. The spaces between them allow the earth to sift between them, but are so close together as to allow no potatoes worth saving to pass through. The general shape of these rods in combination is such that they invert the earth on each side, leaving the potatoes on the top of the loosened earth, or in the row behind the digger. The rod F is a brace or stretcher, and to this the draft is applied, or applied to the stem near the point D. G is a guard or guide-rod attached to the upper part of the frame, and descends diagonally forward, so that it crosses the center line of the machine and ends about one foot above the cutting-edge $e\ e'$. The purpose of this guide is to turn aside the tops of potatoes or weeds and thereby prevent the clogging of the machine.

The cutting or penetrating edge of the digger goes freely into the ground and passes under the whole hill, and as it is at right angles with the line of motion there is no lateral displacement or tendency to jump sidewise, as there is with pointed or curved cutting-edges. The angles at which the tool rises from $e\ e'$ is such (from twenty to thirty degrees) that it tends to break up or pulverize the earth and effectually loosen the potatoes from the earth in which they have grown.

I claim—

In a potato-plow, the combination of the straight cutting-edge for penetrating the ground, set at such an angle with the ground as to cause it to enter readily, combined with a set of guide or screw-rods, substantially as set forth.

JOSEPH SMITH.

Witnesses:
 C. W. JOHNSTON,
 L. F. WARD.

(114)